US008142001B2

(12) United States Patent
Yoneda

(10) Patent No.: US 8,142,001 B2
(45) Date of Patent: Mar. 27, 2012

(54) INK JET PRINT HEAD MANUFACTURING METHOD AND INK JET PRINT HEAD

(75) Inventor: Isamu Yoneda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 12/483,793

(22) Filed: Jun. 12, 2009

(65) Prior Publication Data

US 2009/0309938 A1 Dec. 17, 2009

(30) Foreign Application Priority Data

Jun. 17, 2008 (JP) ................................ 2008-157899

(51) Int. Cl.
*B41J 2/175* (2006.01)
*B29C 65/48* (2006.01)

(52) U.S. Cl. ......................................... 347/87; 156/295

(58) Field of Classification Search .................... 347/20, 347/66, 86, 87; 156/91, 92, 293, 295; 29/890.01
See application file for complete search history.

(56) References Cited

U.S. PATENT DOCUMENTS 5,387,314 A * 2/1995 Baughman et al. ............. 216/27
5,997,125 A * 12/1999 Nishioka et al. ................ 347/20
6,637,870 B2 * 10/2003 Sakamoto et al. .............. 347/71

FOREIGN PATENT DOCUMENTS

JP 2001-47620 2/2001
JP 2001-162802 6/2001

* cited by examiner

*Primary Examiner* — Anh T. N. Vo
(74) *Attorney, Agent, or Firm* — Fitzpatrick, Cella, Harper & Scinto

(57) ABSTRACT

An ink jet print head manufacturing method and an ink jet print head are provided in which a shape of an adhesive that bonds a support member and a print element substrate together is controlled to maintain a high level of ink ejection performance even if the print element substrate is reduced in size. The adhesive, after being disposed between the support member and the print element substrate, is elongated and then hardened. This process allows the shape of the adhesive to be controlled, securing a sufficient ink path between an ink supply port on the support member side and an ink introducing port on the print element substrate side.

10 Claims, 11 Drawing Sheets

INK JET PRINT HEAD MANUFACTURING METHOD AND INK JET PRINT HEAD

BACKGROUND OF THE INVENTION

1. Field of the Invention

The present invention relates to a method of manufacturing an ink jet print head in which an ink ejecting print element and a support member capable of supplying ink to the print element are bonded together with adhesive. The invention also relates to such an ink jet print head.

2. Description of the Related Art

An example of currently available ink jet print head has a construction as shown in FIG. 8, in which a support member 100 and a chip-like print element substrate 300 are bonded together with an adhesive 400 (see FIG. 9). The print element substrate 300 is bonded to areas surrounding ink supply ports 101 in the support member 100. The print element substrate 300 has a plurality of ejection openings formed therein to eject ink supplied from the ink supply ports 101 of the support member 100. The print element substrate 300 also has an electrothermal conversion element (heater) or a piezoelectric element to create an ink ejection energy.

As shown in FIG. 9, the adhesive 400 applied to the areas surrounding the ink supply ports 101 of the support member 100 is pressed by, and spreads over the back of, the print element substrate 300 as the print element substrate 300 is bonded to the support member 100. FIG. 9 is an enlarged cross section of FIG. 8, showing a bonded portion between the print element substrate 300 and the areas surrounding the ink supply ports 101 of the support member 100. FIG. 9 corresponds to a cross section of the print element substrate 300 taken along the line IX-IX of FIG. 8 and a cross section of the areas surrounding the ink supply ports 101 taken along the line IX-IX of FIG. 8. Designated 101A is a surface of the support member 100 in which the ink supply ports 101 are formed. Denoted 301 is a surface of the print element substrate 300 in which ink introducing ports 301 are formed. S0 indicates a squeezed-out portion of the adhesive 400.

When the amount of the squeezed-out portion S0 of the adhesive 400 becomes large, a possibility increases that communication portions between the ink supply ports 101 and the ink introducing ports 301 may be narrowed. The communication portions, when narrowed, may cause quality degradation of printed images due to possible ink ejection failures, leading to a deteriorated yield of print head production. It is therefore necessary to control the amount of squeezed-out portion of the adhesive 400.

As a method for controlling the amount of squeezed-out portion of the adhesive 400, Japanese Patent Laid-Open Nos. 2001-162802 and 2001-47620 proposed a method of absorbing an excess amount of the adhesive 400 into a groove formed in a bonding surface.

To reduce the manufacturing cost of the ink jet print head, there is a growing need in recent years to make the print element substrate 300, the most expensive component in the print head, as small as possible.

FIG. 10A is a cross section of the existing print element substrate 300 of a relatively large size, taken along the line IX-IX of FIG. 8. FIG. 10B is a cross section of the print element substrate 300 of a smaller size, taken along the line IX-IX of FIG. 8. FIG. 10C is a cross section, taken along the line IX-IX of FIG. 8, of those areas of the support member 100 which surround the ink supply ports 101, the support member 100 corresponding to the large size print element substrate 300 of FIG. 10A, FIG. 10D is a cross section, taken along the line IX-IX of FIG. 8, of those areas of the support member 100 which surround the ink supply ports 101, the support member 100 corresponding to the small size print element substrate 300 of FIG. 10B. The print element substrate 300 of this example has three ink introducing ports 301 formed therein, to which three different kinds of inks having different colors or the like can be supplied from the three ink supply ports 101 of the support member 100. The print element substrate 300 is formed with three sets of ejection opening arrays (300A, 300B, and 300C), one for each of the three different inks. The pitch 40 between the three ink introducing ports 301 of the print element substrate 300 matches the pitch between the three ink supply ports 101 of the support member 100. The pitch 400 is hereinafter referred to also as an "inter-color pitch". The width X of the ink introducing ports 301 matches the width of the ink supply ports 101.

As the print element substrate 300 is reduced in size, the inter-color pitch 40 of the print element substrate 300 also decreases as shown in FIG. 10B. At the same time, the inter-color pitch 40 of the support member 100 also decreases as shown in FIG. 10D. The reduction in the inter-color pitch 40 causes the widths X of the ink supply ports 101 and the ink introducing ports 301 to shrink. Since these widths X are required to smoothly supply ink to the print element substrate 300, it is necessary to secure an appropriate size for the width X to ensure precise ink ejections and thereby maintain a high print quality.

In the existing print element substrate 300, a sufficient width X can be secured even if the adhesive 400 is squeezed out into the inside of the ink supply ports 101 and the ink introducing ports 301 by an amount S, as shown in FIG. 11A. So, if the adhesive 400 is squeezed out to some extent, there is little possibility of the communication portions between the ink supply ports 101 and the ink introducing ports 301 being narrowed to such a degree as will degrade the print quality.

However, in the case of the small size print element substrate 300, since the width is narrow, a sufficient width X is difficult to secure when the adhesive 400 is squeezed out by an amount S, as shown in FIG. 11B. So, even if the squeeze-out amount of the adhesive 400 is relatively small, the ink paths between the ink supply ports 101 and the ink introducing ports 301 are likely to be narrowed to a degree that could affect the print quality.

As a measure to solve this problem, a conceivable method may be to have an excess amount of the adhesive 400 absorbed into a groove, as proposed in Japanese Patent Laid-Open Nos. 2001-162802 and 2001-47620. However, when the print element substrate 300 is smaller as in the case of FIG. 11B, it is difficult to secure enough space to form the groove in order to prevent the adhesive 400 from being squeezed out into the ink path.

Another possible method may involve reducing the amount of adhesive 400 applied to the areas surrounding the ink supply ports 101 so as to reduce the squeezed-out volume of the adhesive 400. However, the amount of adhesive 400 to be applied needs to be determined by considering the surface precision of an ink supply port forming surface 101A and an ink introducing port forming surface 301A, the height of the adhesive 400 applied, and precision variations of a print head assembly machine. Therefore, to reduce the amount of adhesive 400 requires increasing the surface precision of the ink supply port forming surface 101A and the ink introducing port forming surface 301A, reducing the height of the adhesive 400 applied, and increasing the precision of the assembly machine, which in turn results in an increase in cost.

SUMMARY OF THE INVENTION

The present invention provides an ink jet print head manufacturing method and an ink jet print head in which the shape of an adhesive to bond a support member and the print element substrate is controlled so that even if the print element substrate is reduced in size, a high ink ejection performance can be maintained.

In the first aspect of the present invention, there is provided a method of manufacturing an ink jet print head, wherein the print head has a print element substrate and a support member bonded together with an adhesive, the print element being capable of ejecting ink introduced from an ink introducing port, the support member having an ink supply port formed therein to supply ink to the ink introducing port, the manufacturing method comprising: a first step of applying the adhesive to at least one of an ink introducing port forming surface of the print element formed with the ink introducing port and an ink supply port forming surface of the support member formed with the ink supply port; a second step of, after the first step, bringing the ink introducing port forming surface and the ink supply port forming surface close together until they come into contact with each other through the adhesive; a third step of, after the second step, increasing a gap between the ink introducing port forming surface and the ink supply port forming surface to elongate the adhesive between the ink introducing port forming surface and the ink supply port forming surface; and a fourth step of, after the third step, hardening the adhesive elongated between the ink introducing port forming surface and the ink supply port forming surface.

In the second aspect of the present invention, there is an ink jet print head, which has a print element and a support member bonded together with an adhesive, the print element being capable of ejecting ink introduced from an ink introducing port, the support member having an ink supply port formed therein to supply ink to the ink introducing port, wherein an ink introducing port forming surface of the print element formed with the ink introducing port and an ink supply port forming surface of the support member formed with the ink supply port are bonded together with the adhesive; wherein a width of an intermediate portion of the adhesive disposed between the ink introducing port forming surface and the ink supply port forming surface is smaller than a width of a bonding surface of the adhesive with at least the ink introducing port forming surface or the ink supply port forming surface.

In the third aspect of the present invention, there is an ink jet print head, which has a print element and a support member bonded together with an adhesive, the print element being capable of ejecting ink introduced from an ink introducing port, the support member having an ink supply port formed therein to supply ink to the ink introducing port, wherein an ink introducing port forming surface of the print element formed with the ink introducing port and an ink supply port forming surface of the support member formed with the ink supply port are bonded together with the adhesive; wherein an intermediate portion of the adhesive disposed between the ink introducing port forming surface and the ink supply port forming surface is situated outside at least one of the ink introducing port and the ink supply port.

With this invention, the shape of the adhesive is controlled by spreading the adhesive disposed between the support member and the print element substrate and hardening it, to enable a large enough ink path to be formed between the ink supply port of the support member and the ink introducing port of the print element substrate. This allows the print element substrate, even if reduced in size, to smoothly supply ink, maintaining a high ink ejection performance and printing high-quality images. The invention also improves yields of print head manufacturing and thereby provides the high quality print head at lower cost.

Further features of the present invention will become apparent from the following description of exemplary embodiments (with reference to the attached drawings).

DESCRIPTION OF THE EMBODIMENTS

Now, embodiments of this invention will be described by referring to the accompanying drawings.

Figure 1:
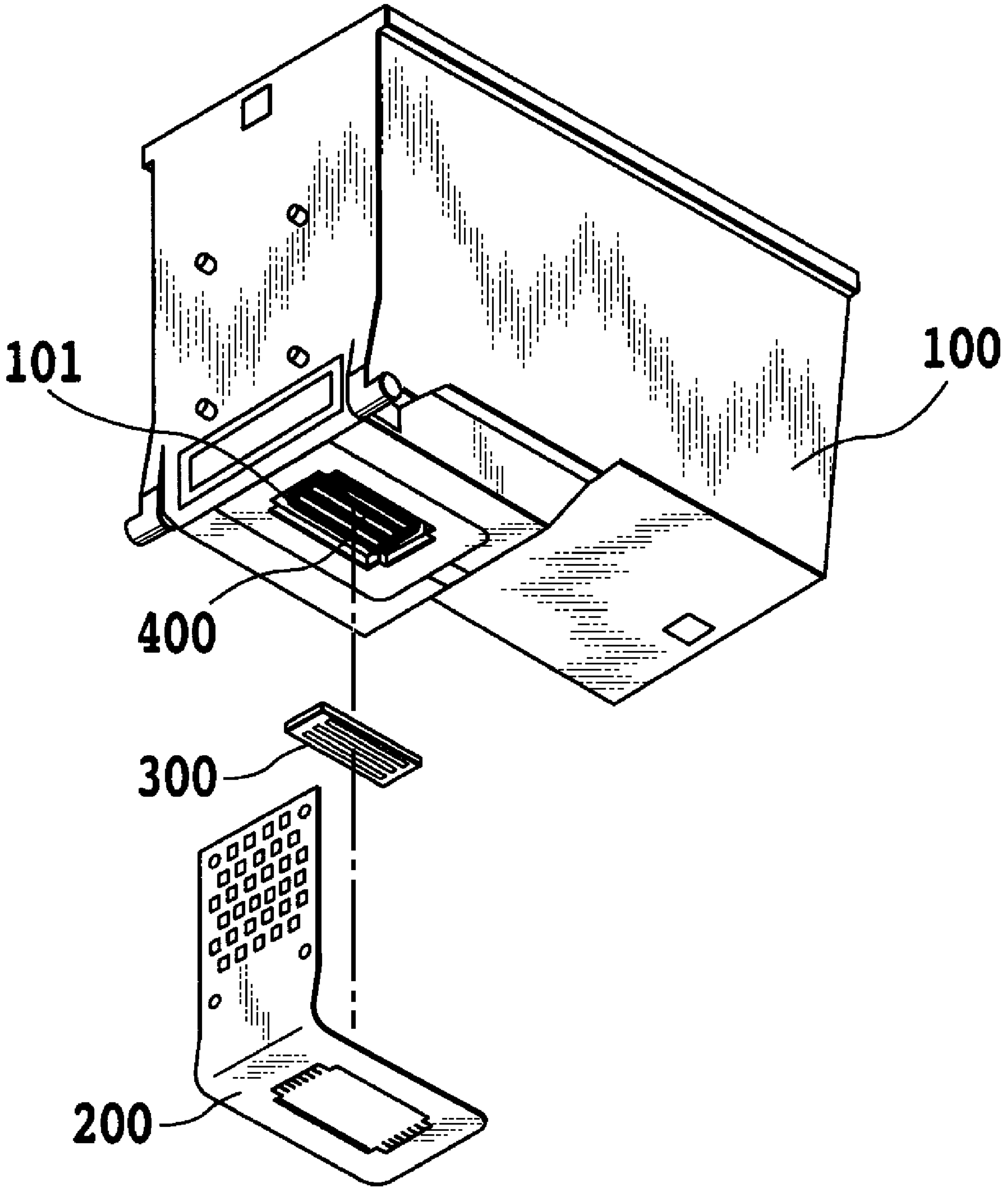
FIG. 1 is an exploded perspective view showing an example construction of an ink jet print head of this invention.

FIG. 1 is a perspective view showing an example of an overall construction of an ink jet print head according to this invention. Portions similar to those of the conventional print head are assigned like reference numerals and their explanations are omitted here.

In the print head of this example, a lead portion of an electric wiring tape 200 is electrically connected to electrode terminals of a chip-like print element substrate 300. The print element substrate 300 is bonded with an adhesive 400 to a surface of a support member 100 at areas surrounding ink supply ports 101. The electrode terminals of the print element substrate 300 and exposed parts of the lead portion of the electric wiring tape 200 are sealed with a sealing agent.

In a step of bonding an ink introducing port forming surface 301A of the print element substrate 300 to areas surrounding the ink supply ports 101 of the support member 100

(ink supply port forming surface 101A), the adhesive 400 is applied by dispensing or transfer printing or the like. In the case of dispensing, a work (support member 100 or print element substrate 300) and a syringe with a needle (filled with the adhesive 400) are set in a 3-axis application device. Then, the adhesive 400 is applied to predetermined points arranged in line or in scattered dots on the work. In the case of transfer printing, the adhesive 400 is spread to a uniform height on a disk that is rotating at a constant speed. Then, transfer pins arranged in a pattern that matches an adhesive application area (ink supply port forming surface 101A or ink introducing port forming surface 301A) are moved up and down to transfer the adhesive 400. The adhesive 400 may generally be of ultraviolet cure type that hardens upon being radiated with ultraviolet light, or thermosetting type that hardens when heated, or a combination of these.

Figure 2:
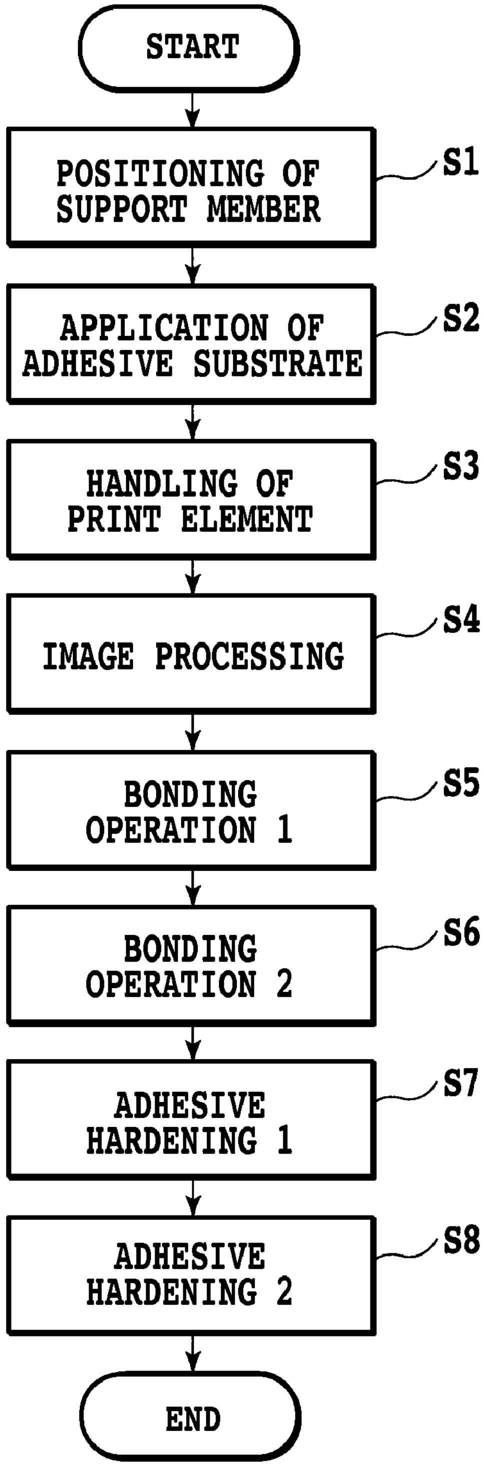
FIG. 2 is a flow chart showing a process of manufacturing the ink jet print head of this invention.

FIG. 2 is a flow chart showing a sequence of steps for bonding the print element substrate 300 to the surface of the support member 100 at the areas surrounding the ink supply ports 101. FIGS. 3A to 3D are enlarged cross-sectional, views of bonding parts during the process of FIG. 2.

First, the support member 100 is fixed at a predetermined position using a dedicated fixing jig (step S1). The method for positioning and fixing the support member 100 may involve using a reference surface (not shown) and then positioning and fixing the support member 100 with an accuracy of ±10 μm or less.

Next, the adhesive 400 is applied or transferred to the areas of the support member 100 surrounding the ink supply ports 101 by dispensing or transfer printing (step S2). In this example, an ultraviolet cure adhesive with a viscosity of around 10,000 cps was used as the adhesive 400 and applied by dispensing. The height H0 (see FIG. 3A) of the adhesive 400 from the point P0 on the surface of the areas surrounding the ink supply ports 101 was set to about 120 μm. The adhesive 400 may be a thermosetting type, or a combination of ultraviolet cure type and thermosetting type. The adhesive 400 needs only to be applied to at least one of the portions on the ink supply port forming surface and on the ink introducing port forming surface.

Next, the print element substrate 300, electrically connected to the electric wiring tape 200, is sucked and held by a handling unit 500 (see FIG. 3A) (step S3). The print element substrate 300 may also be held by a mechanical clamp or a combination of the mechanical clamp and suction. Next, an image of the print element substrate handled is taken and processed to measure its position and determine a distance between the print element substrate 300 and the support member 100 (step S4). In the image processing, the resolution used to determine the position of the print element substrate 300 is, for example, 0.5 μm or less.

Figure 3A:
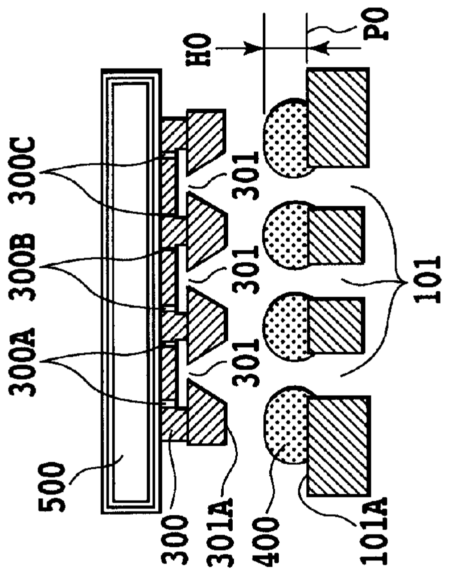
FIGS. 3A, 3B, 3C and 3D are enlarged cross sectional views of bonded portions between a print element substrate and a support member in the manufacturing process of FIG. 2.

FIG. 3A illustrates a state following the end of the image processing step (step S4), showing the print element substrate 300 held by the handling unit 500. The adhesive 400 maintains its bulging shape on the surface of the areas surrounding the ink supply ports 101 by its own surface tension.

Figure 3B:
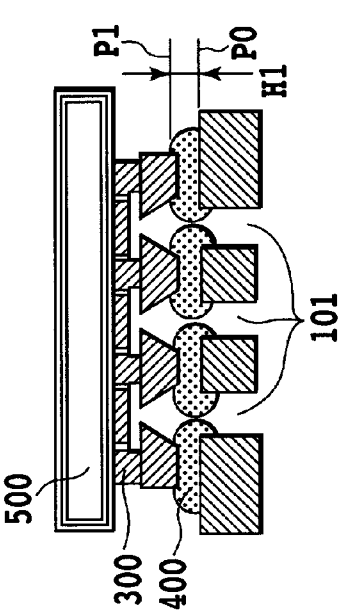

Then, in a bonding operation 1 (step S5), the print element substrate 300 is moved by the handling unit 500 according to the positional relation between the print element substrate 300 and the support member 100 determined at the previous image processing step (step S4). Then, the ink introducing port forming surface 301A of the print element substrate 300 is located at a first position P1. The first position P1 is a position at which the ink introducing port forming surface 301A is completely in contact with the adhesive 400, as shown in FIG. 3B. Thus, the ink supply port forming surface 101A and the ink introducing port forming surface 301A are indirectly in contact with each other through the adhesive 400. In this example, a gap H1 between the position P0 of the ink supply port forming surface 101A of the support member 100 and the first position P1 was set at about 70 μm. As the ink introducing port forming surface 301A moves to the first position P1, the adhesive 400 gets depressed to a predetermined degree between the print element substrate 300 and the support member 100, and bulges out to the sides as shown in FIG. 3B. The first position P1 varies depending on the height H0 of the applied adhesive 400 in the application step (step 32). The resolution with which to control the movement of the print element substrate 300 by the handling unit 500 may, for example, be 1 μm or less.

Figure 4:
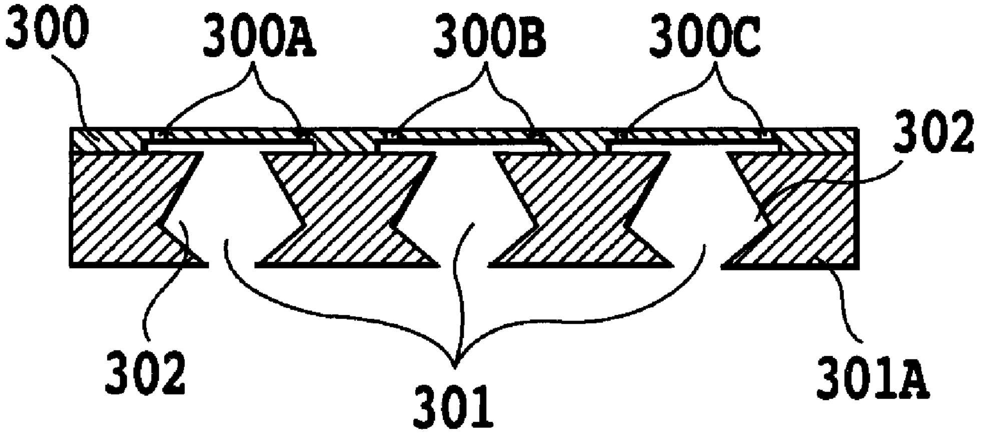
FIG. 4 is a cross-sectional view of the print element substrate having rectangular portions.

FIG. 4 is a cross-sectional view of the print element substrate 300 having rectangular recessed portions 302 formed inside the ink introducing ports 301. The recessed portions 302 may accommodate excess volumes of adhesive 400.

Figure 3C:
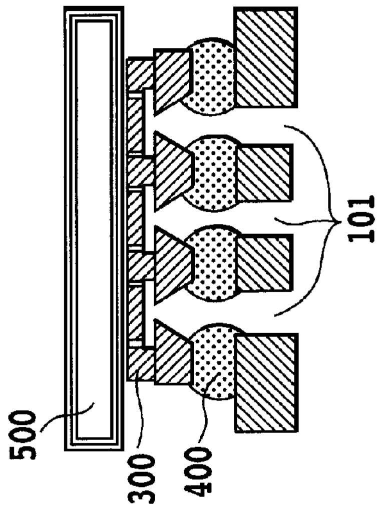
Figure 3D:
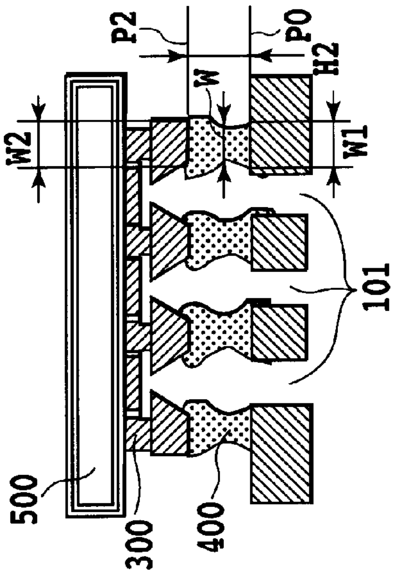

After this, in a bonding operation 2 (step S6), the print element substrate 300 is moved in a direction that increases the gap between the print element substrate 300 and the support member 100 from the first gap H1, as shown in FIG. 3C and FIG. 3D. FIG. 3C shows the gap H1 being increased as the print element substrate 300 is moved by the handling unit 500, until it reaches a second gap H2 as shown in FIG. 3D. As a result of the movement of the print element substrate 300, the adhesive 400, that was depressed and bulging toward the sides in the bonding operation 1 (step S5), is pulled, reducing the bulging amount of the squeezed-out portion, as shown in FIG. 3D. In this example, the final second gap H2 was set to about 150 μm.

When the gap between the print element substrate 300 and the support member 100 is increased to the gap H2 as shown in FIG. 3D, the adhesive 400 that was squeezed out toward the sides is pulled and elongated and gets a recessed middle portion so as to have a shape including a constricted part. As a result, an intermediate portion of the adhesive 400 situated between the ink introducing port forming surface 301A and the ink supply port forming surface 101A is reduced in width W in a horizontal direction in FIG. 3D. When W1 and W2 denote the widths of contact surfaces of the adhesive 400 with the ink introducing port forming surface 301A and the ink supply port forming surface 101A in the horizontal direction in FIG. 3D, the width W is smaller than at least one of W1 and W2. The intermediate portion of the adhesive 400 is situated outside at least the ink introducing port 301 or the ink supply port 101. That is, the intermediate portion of the adhesive 400 lies outside a space defined by the ink introducing ports 301 being extended downward in FIG. 3D and/or outside a space defined by the ink supply ports 101 being extended upward in FIG. 3D.

If the width of the ink supply port 101 and the width of the ink introducing port 301 differ, the intermediate portion of the adhesive 400 needs only to be situated outside of the ink supply port 101 or the ink introducing port 301 smaller in width.

Then it is possible to secure large enough ink path between the ink supply port 101 and the ink introducing port 301.

In this example, the print element substrate 300 was moved to widen the gap between the print element substrate 300 and the support member 100. It is also possible to move the support member 100 or both of the print element substrate 300 and the support member 100.

Next, in an adhesive hardening operation 1 (step S7), ultraviolet light is shone for about 5 seconds to preliminarily harden the adhesive 400. This hardens the adhesive 400 to a degree that sustains the shape of the adhesive 400 and which prevents the print element substrate 300 from shifting from the surface of the areas surrounding the ink supply ports 101 due to vibrations during its transport to the next step. Another method for provisional hardening of the adhesive 400 includes the use of hot air and halogen light from a heat source.

Next, in an adhesive hardening operation 2 (step S8), the adhesive 400 that was preliminarily hardened in the preceding adhesive hardening operation 1 (step S7) is heated in a cure furnace at around 100° C. for one hour for complete hardening. If the adhesive 400 can be hardened enough in the previous adhesive hardening operation 1 (step S7), the adhesive hardening operation 2 (step S8) is not required.

FIG. 5A to FIG. 7B are drawings for explaining a degree of the extension of the adhesive 400 by the bonding operation 2 (step S6).

Figure 5A:
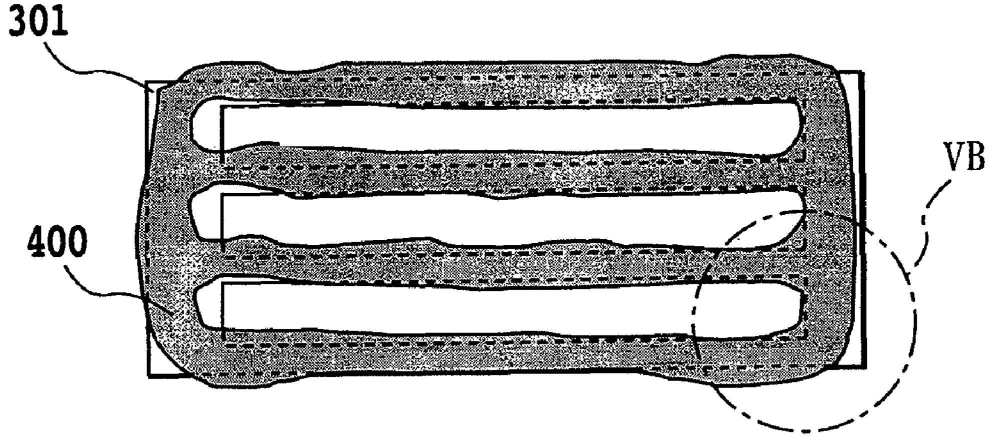
FIG. 5A is a back view of a major part of the print element substrate, showing a comparative example of squeezed-out portions of an adhesive.
Figure 5B:
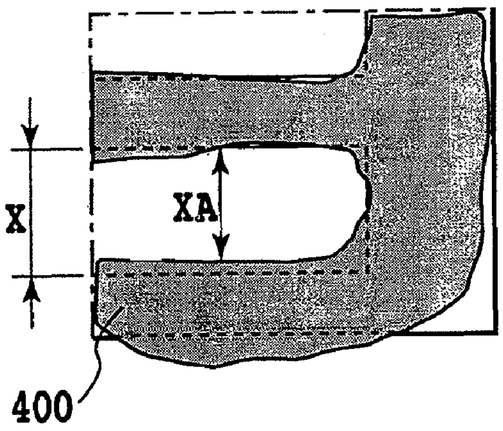
FIG. 5B is an enlarged view of part VB in FIG. 5A.

FIG. 5A and FIG. 5B represent a case in which the gap H1 between the print element substrate 300 and the support member 100 is maintained without being increased in the bonding operation 2 (step S6). FIG. 5A shows an observation on a squeezing out state of the adhesive 400, as seen from the ink introducing ports 301 side of the print element substrate 300. FIG. 5B is an enlarged view of a portion VB in FIG. 5A. The squeezed-out portions of the adhesive 400 narrowed the width XA of the ink path between the ink supply port 101 and the ink introducing port 301, with the result that the width XA is smaller than the width X of the ink supply port 101.

Figure 6A:
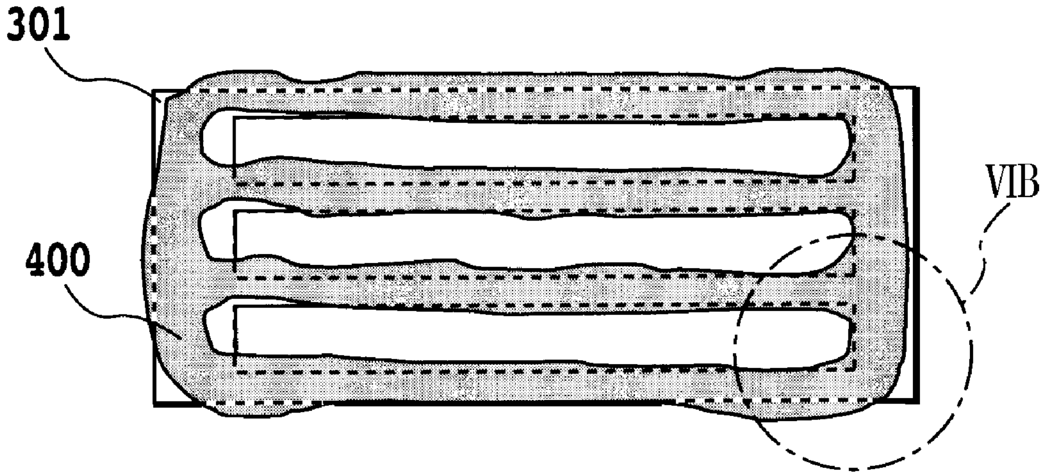
FIG. 6A is a back view of a major part of the print element substrate, showing an another comparative example of squeezed-out portions of an adhesive.
Figure 6B:
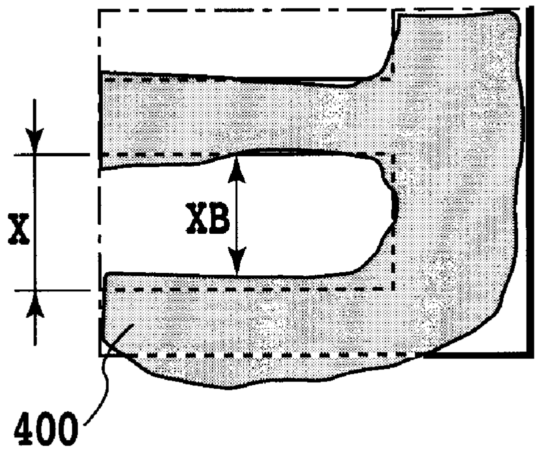
FIG. 6B is an enlarged view of part VIB in FIG. 6A.

FIG. 6A and FIG. 6C represent a case in which the gap H1 between the print element substrate 300 and the support member 100 is widened from 70 μm to the gap H2 of about 100 μm in the bonding operation 2 (step S6). FIG. 6A shows an observation on a squeezing out state of the adhesive 400, as seen from the ink introducing ports 301 side of the print element substrate 300. FIG. 6B is an enlarged view of a portion VIB in FIG. 6A. These figures show that the amount of squeezed-out portion of the adhesive 400 is advantageously smaller than that of FIG. 5A and FIG. 5B. However, the width XB (>XA) of the ink path between the ink supply port 101 and the ink introducing port 301 is somewhat narrower than the width X of the ink supply port 101.

Figure 7A:
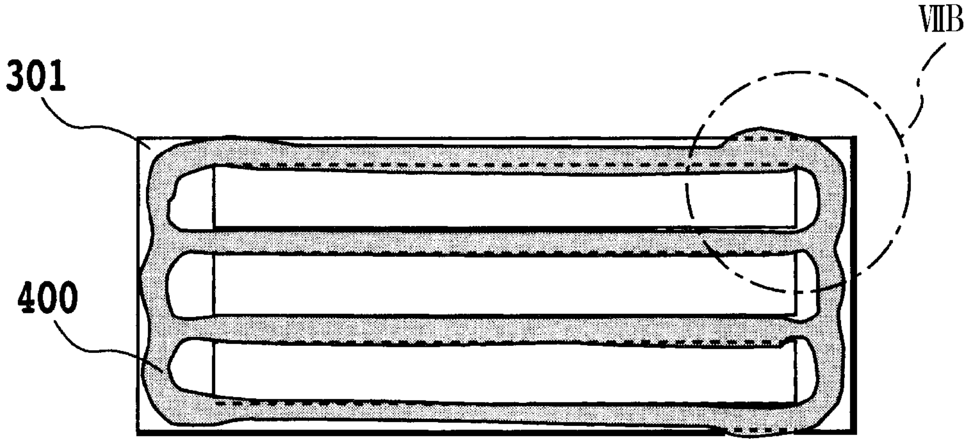
FIG. 7A is a back view of a major part of the print element substrate, showing a further comparative example of squeezed-out portions of an adhesive.
Figure 7B:
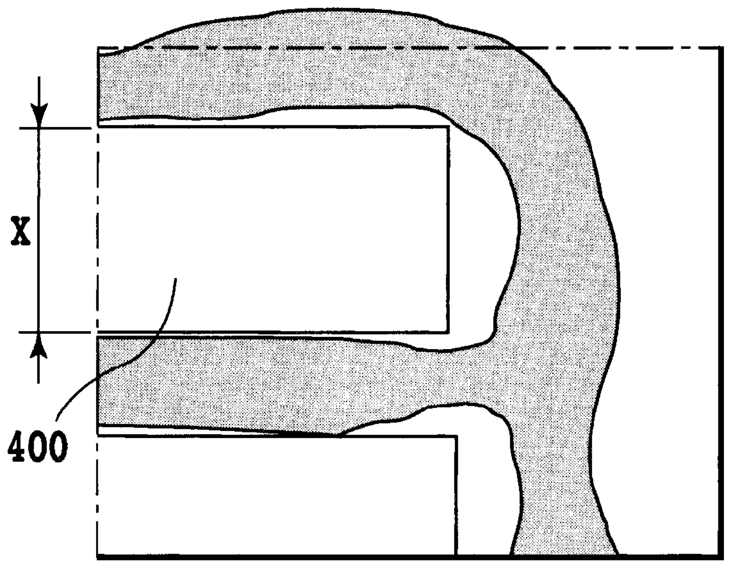
FIG. 7B is an enlarged view of part VIIB in FIG. 7A.
Figure 8:
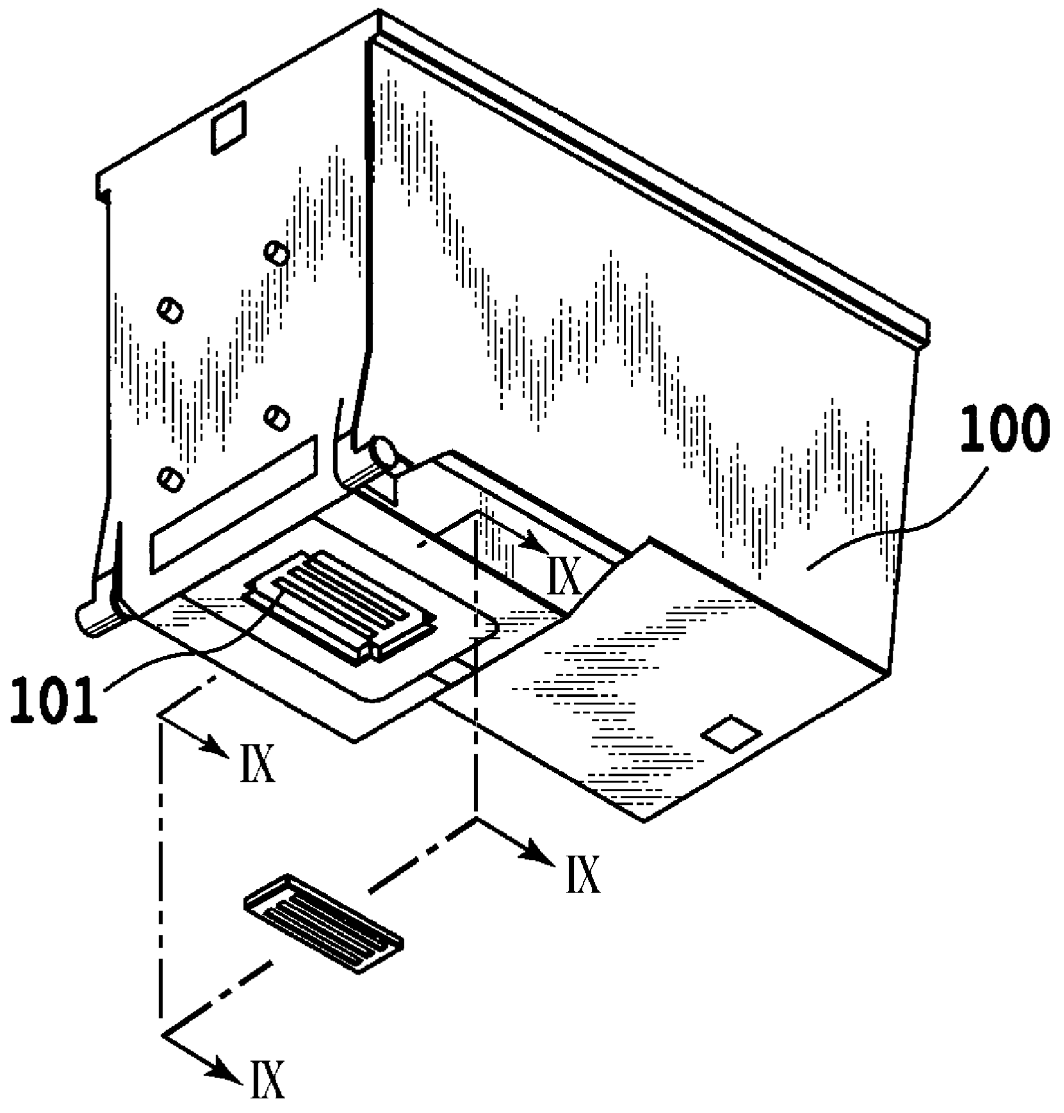
FIG. 8 is an exploded perspective view of the ink jet print head.
Figure 9:
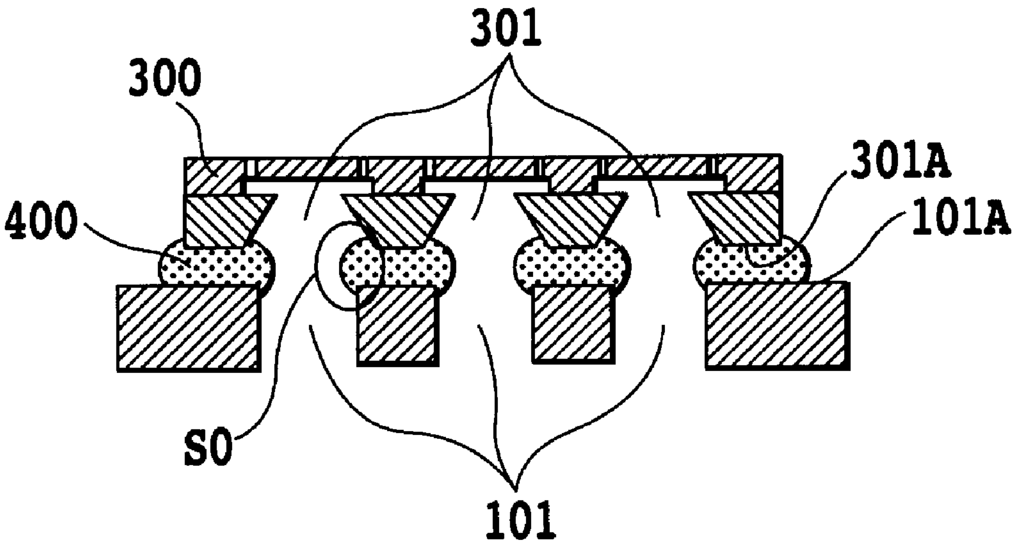
FIG. 9 is an enlarged cross-sectional view of essential portions of a conventional ink jet print head, showing squeezed-out portions of an adhesive.

FIG. 7A and FIG. 7B represent a case in which the gap H1 between the print element substrate 300 and the support member 100 is widened from 70 μm to the gap H2 of about 200 μm in the bonding operation 2 (step S6). FIG. 7A shows an observation on a squeezing out state of the adhesive 400, as seen from the ink introducing port forming surface 301A side of the print element substrate 300. FIG. 7B is an enlarged view of a portion VIIB in FIG. 7A. These figures show that the squeezed-out portion of the adhesive 400 no longer exists and that the width of the ink path between the ink supply port 101 and the ink introducing port 301 is not smaller than the width X of the ink supply port 101. It is, however, noted that the adhesive 400 is stretched excessively.

In this example, therefore, the adhesive 400 with a viscosity of around 10,000 cps was used and, during the bonding operation 2 (step S6), the gap H2 between the support member 100 and the print element substrate 300 was set to about 150 μm. It was found that the adhesive 400 was not extended excessively and that the amount of squeezed-out portion was able to be controlled.

In the bonding operation 2 (step S6), by how much the gap between the support member 100 and the print element substrate 300 should be increased may be determined optimally according to the amount of adhesive 400 to be applied, its characteristics (viscosity) and the surface conditions of the bonding surfaces (ink supply port forming surface and ink introducing port forming surface). This allows the amount of squeezed-out portion of the adhesive 400 to be minimized effectively.

Figure 10A:
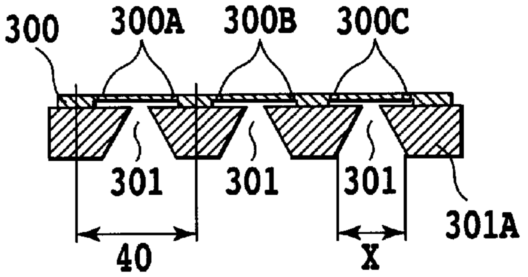
FIG. 10A is a cross-sectional view of an existing print element substrate.
Figure 10B:
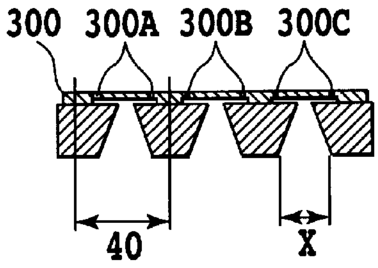
FIG. 10B is a cross-sectional view of a small-size print element substrate.
Figure 10C:
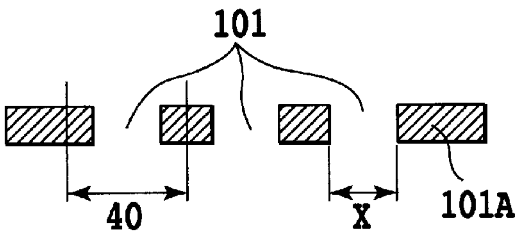
FIG. 10C is a cross-sectional view of ink supply ports corresponding to the print element substrate of FIG. 10A.
Figure 10D:
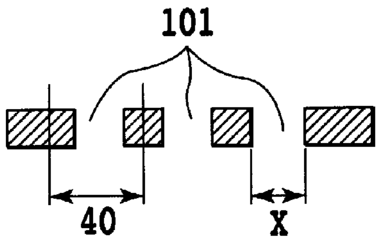
FIG. 10D is a cross-sectional view of ink supply ports corresponding to the print element substrate of FIG. 10B.
Figure 11A:
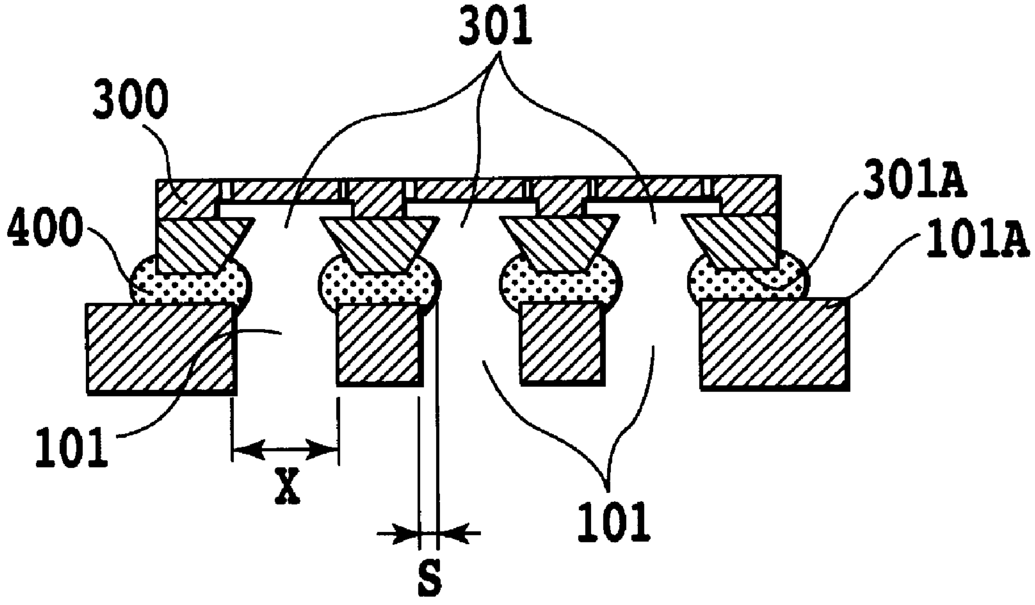
FIG. 11A is a cross-sectional view of a conventional print head with a print element substrate of the existing size.
Figure 11B:
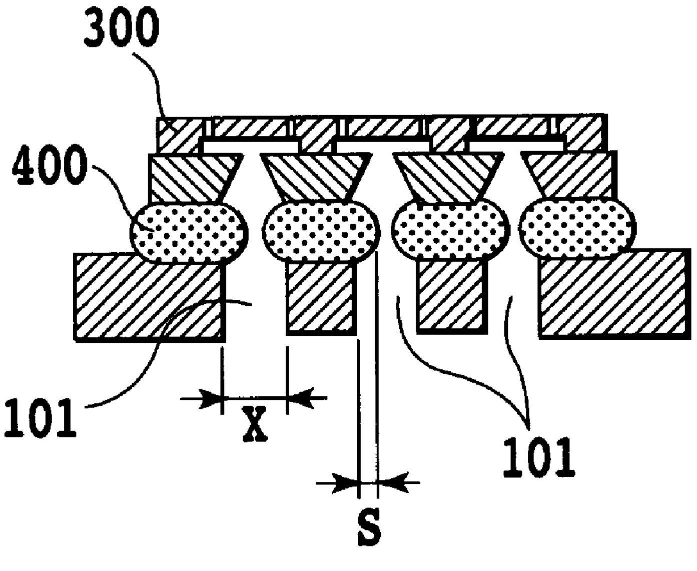
FIG. 11B is a cross-sectional view of a conventional print head with a print element substrate of a smaller size.

As described above, by elongating the adhesive 400 in the bonding operation 2 (step S6) followed by its hardening, the squeezed-out portion size of the adhesive 400 can be minimized to secure a sufficient width of the ink supply ports 101. It is therefore possible to secure sufficient ink paths even if a small-size print element substrate 300, such as shown in FIG. 10B, is bonded, thus eliminating problems of insufficient ink supply and ink ejection failures caused by narrowed ink path and therefore a problem of degradation of print quality. This in turn improves a production yield of the print head, lowering its cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-157899, filed Jun. 17, 2008, which is hereby incorporated by reference herein in its entirety.

What is claimed is:

1. A method of manufacturing an ink jet print head comprising:

- a first step of preparing a print element substrate, a support member for supporting the print element substrate, and an adhesive, the print element substrate having an ink ejection opening for ejecting ink and an ink introducing port forming surface formed with an ink introducing port for introducing ink to the ink ejection opening, the support member having an ink supply port forming surface formed with an ink supply port for supplying ink to the ink introducing port, the adhesive being applied to at least one of the ink introducing port forming surface and the ink supply port forming surface;
- a second step of sandwiching the adhesive between the ink introducing port forming surface and the ink supply port forming surface;
- a third step of increasing a gap between the ink introducing port forming surface and the ink supply port forming surface, with the adhesive sandwiched between the ink introducing port forming surface and the ink supply port forming surface, to elongate the adhesive between the ink introducing port forming surface and the ink supply port forming surface; and
- a fourth step of hardening the adhesive elongated between the ink introducing port forming surface and the ink supply port forming surface.

2. The ink jet print head manufacturing method according to claim 1, wherein the second step depresses the adhesive between the ink introducing port forming surface and the ink supply port forming surface to a predetermined degree.

3. The ink jet print head manufacturing method according to claim 1, wherein the third step elongates the adhesive until a small width portion of the adhesive is formed, the small width portion being positioned at a portion other than a contact surface of the adhesive contacting at least one of the ink introducing port forming surface and the ink supply port forming surface, a width of the small width portion in a cross-section perpendicular to the contact surface being smaller than that of the contact surface in the cross-section.

4. The ink jet print head manufacturing method according to claim 3, wherein the third step elongates the adhesive until the small width portion is situated outside at least one of the ink introducing port and the ink supply port.

5. The ink jet print head manufacturing method according to claim 3, wherein the third step elongates the adhesive until the small width portion is formed at an intermediate portion of the adhesive disposed between the ink introducing port forming surface and the ink supply port forming surface.

6. The ink jet print head manufacturing method according to claim 1, wherein a plurality of ink introducing ports and ink supply ports are provided and the adhesive is applied to at least those areas on the ink introducing port forming surface which surround the plurality of the ink introducing ports or those areas on the ink supply port forming surface which surround the plurality of the ink supply ports.

7. The ink jet print head manufacturing method according to claim 1, wherein the fourth step includes a step of preliminarily hardening the adhesive.

8. An ink jet print head comprising:

a print element substrate having an ink ejection opening for ejecting ink and an ink introducing port forming surface formed with an ink introducing port for introducing ink to the ink ejection opening; and a support member having an ink supply port forming surface formed with an ink supply port for supplying ink to the ink introducing port, the ink supply port forming surface being bonded with the ink introducing port forming surface to support the print element substrate by an adhesive, wherein the adhesive has a small width portion, the small width portion being positioned at a portion other than a contact surface of the adhesive contacting at least one of the ink introducing port forming surface and the ink supply port forming surface, a width of the small width portion in a cross-section perpendicular to the contact surface being smaller than that of the contact surface in the cross-section.

9. The ink jet print head according to claim 8, wherein the small width portion is situated outside at least one of the ink introducing port and the ink supply port.

10. The ink jet print head according to claim 8, wherein the small width portion is an intermediate portion of the adhesive disposed between the ink introducing port forming surface and the ink supply port forming surface.

* * * * *